(12) United States Patent  
Spreckels

(10) Patent No.: US 9,777,800 B2  
(45) Date of Patent: Oct. 3, 2017

(54) SYNCHRONIZER RING

(71) Applicant: Oerlikon Friction Systems (Germany) GmbH, Bremen (DE)

(72) Inventor: Marcus Spreckels, Bremen (DE)

(73) Assignee: OERLIKON FRICTION SYSTEMS (GERMANY) GMBH, Bremen (DE)

( * ) Notice: Subject to any disclaimer, the term of this patent is extended or adjusted under 35 U.S.C. 154(b) by 0 days.

(21) Appl. No.: 14/318,533

(22) Filed: Jun. 27, 2014

(65) Prior Publication Data

US 2014/0374209 A1  Dec. 25, 2014

Related U.S. Application Data

(63) Continuation of application No. 11/891,584, filed on Aug. 9, 2007, now abandoned.

(30) Foreign Application Priority Data

Sep. 15, 2006  (EP) ..................... 06120716

(51) Int. Cl.
F16D 23/02 (2006.01)
F16H 3/38 (2006.01)

(52) U.S. Cl.
CPC ............ F16H 3/38 (2013.01); F16D 23/025 (2013.01)

(58) Field of Classification Search
CPC ........ F16D 23/025; F16D 23/04; F16D 23/06; F16D 2023/0681; F16H 3/38
USPC ..... 192/53.34, 53.341, 53.342, 53.343, 66.2, 192/107 R, 108
See application file for complete search history.

(56) References Cited

U.S. PATENT DOCUMENTS

| | | | |
|---|---|---|---|
| 2,238,723 A * | 4/1941 | Fishburn | 192/53.31 |
| 4,742,723 A | 5/1988 | Lanzerath et al. | |
| 5,626,214 A | 5/1997 | Schlaich | |
| 5,657,844 A * | 8/1997 | Wagner | 192/53.32 |
| 5,738,194 A | 4/1998 | Hughes | |
| 6,065,579 A | 5/2000 | Nels | |
| 6,547,052 B1 | 4/2003 | Schwuger et al. | |
| 6,588,563 B1 | 7/2003 | Sarrach et al. | |
| 7,134,537 B2 | 11/2006 | Schwuger et al. | |
| 2005/0016307 A1 | 1/2005 | Schwuger et al. | |

(Continued)

FOREIGN PATENT DOCUMENTS

| | | |
|---|---|---|
| DE | 35 19 811 | 12/1986 |
| DE | 197 19 618 | 11/1998 |
| DE | 198 53 856 | 5/2000 |

(Continued)

*Primary Examiner* — Terry Chau

(74) *Attorney, Agent, or Firm* — Greenblum & Bernstein, P.L.C.

(57) ABSTRACT

Synchronizer ring made of deep-drawable sheet metal. The ring includes a ring-shaped sheet metal body having a conical section arranged between a wall and a hub surface. One or more radially outwardly projecting guide elements are defined by radially outwardly projecting tapered indentations integrally formed with the ring-shaped sheet metal body. The wall is located at a largest conical diameter side of the ring-shaped sheet metal body and extends substantially perpendicular to a ring body axis. Gear teeth are arranged on a radially outer end of the wall. The one or more guide elements are configured to provide centering guidance relative to a hollow cylindrical surface of a synchronizer ring hub.

23 Claims, 4 Drawing Sheets

(56) References Cited

U.S. PATENT DOCUMENTS

2008/0149450 A1* 6/2008 Christoffer et al. ....... 192/53.34

FOREIGN PATENT DOCUMENTS

| | | |
|---|---|---|
| DE | 199 22 325 | 7/2000 |
| DE | 10028472 A1 * | 12/2001 |
| EP | 0 717 212 | 6/1996 |
| JP | 58-074628 | 5/1983 |
| JP | 62-046047 | 2/1987 |
| JP | 62-046048 | 2/1987 |
| JP | 08-219173 | 8/1996 |
| JP | 8219175 | 8/1996 |
| JP | 10078047 | 3/1998 |
| JP | 2004-076764 | 3/2004 |
| JP | 2005-344849 | 12/2005 |
| WO | WO 2005068866 A1 * | 7/2005 |

* cited by examiner

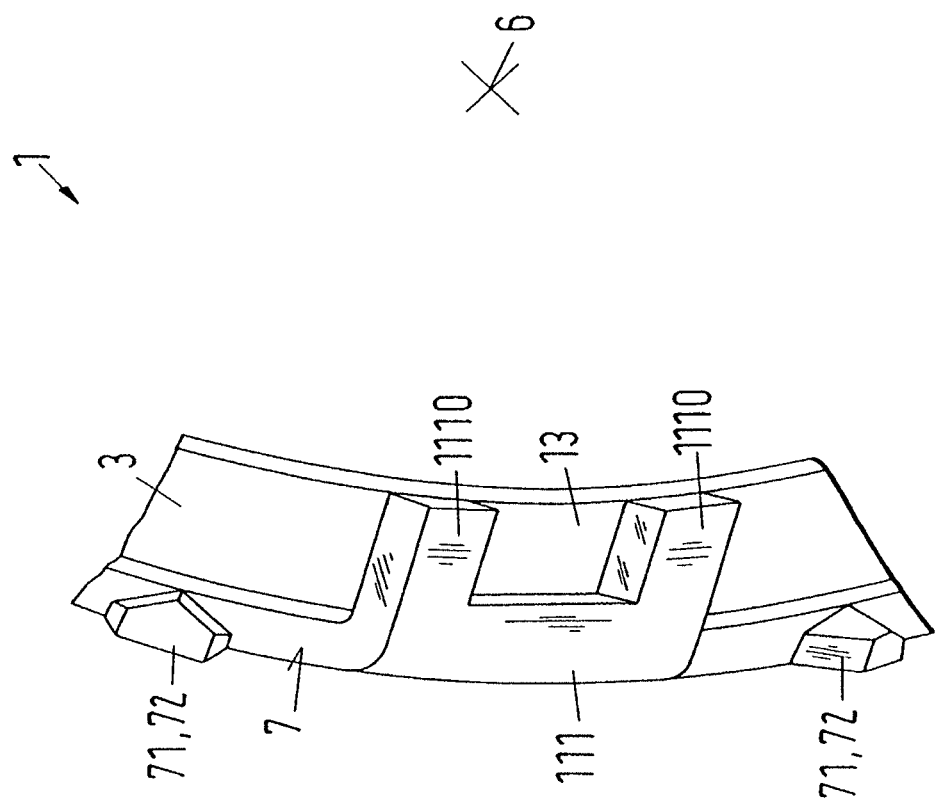

SYNCHRONIZER RING

CROSS-REFERENCES TO RELATED APPLICATIONS

This application is a continuation of U.S. application Ser. No. 11/891,584, filed Aug. 9, 2007, which claims the priority of European Patent Application No. 06120716.3, filed Sep. 15, 2006, the disclosures of which are incorporated herein by reference.

BACKGROUND OF THE INVENTION

The invention relates to a synchroniser ring for a synchronising device of a shiftable change speed gear transmission as well as to a manual transmission for a vehicle in accordance with the preamble of the independent claims 1 and 10.

In a mechanical, shiftable change speed gear transmission, e.g. in vehicle transmissions, synchroniser rings serve to synchronize the relative speeds which occur between the gear wheel and the gear shaft on a gear change to one another. The synchronisation is achieved by friction between the corresponding friction partners. The function of such transmissions and the process of the synchronisation procedure are known per se and no longer have to be explained in more detail to the person skilled in the art here.

It is known for protection against premature wear and/or to improve the friction characteristic to provide the friction surfaces of synchroniser rings with a friction layer, said synchroniser rings being produced as a rule from a metal or a metal alloy such as from brass or steel. Very different types of friction layers are in use in this connection, e.g. thermal injection layers made of molybdenum, carbon friction layers or friction layers made from other materials.

A support for a conical synchroniser ring is described in DE 35 19811 A1 which has an outer sprocket ring divided into three and is arranged in a cylindrical hollow space of a synchroniser ring hub, which is also frequently called a synchroniser ring member, and is anchored substantially rotationally fixedly to the synchroniser ring hub via abutments which are formed as lobes. Substantially rotationally fixedly within the context of this application means that, with the exception of small angle excursions in the peripheral direction, the synchroniser ring is rotationally fixedly connected to the synchroniser ring hub.

DE 198 53 856 A1 describes a further development of the previously described synchroniser ring, with the synchroniser ring of DE 198 53 856 A1 being characterised in that its width is substantially only determined by the required width of its friction surface. This is achieved in that an abutment, which corresponds to the lobes in accordance with DE 35 19811 A1 in function, is arranged at or close to an end portion of the ring member with a smaller conical diameter and in that the contour of the abutment in the radial direction projects beyond the contour of the outer jacket surface of the ring member.

Both synchroniser rings are admittedly basically properly secured by the lobes or abutments against a rotation with respect to the synchroniser ring hub in the operating state, but both lack a reliable guidance in the radial direction in the cylindrical hollow space in the synchronous ring hub.

This means the synchroniser rings known from the prior art are admittedly secured against a rotation in the peripheral direction with respect to the synchronous ring hub, but these rings tend increasedly to uncontrolled movements due to their conical outer shape which cooperates with a cylindrical inner contact surface in the cylindrical hollow space of the synchroniser ring hub, e.g. to small radial excursions or tilt movements which can be expressed e.g. in unpleasant vibrations, and thus have a negative effect on the reliability and precision of the synchronisation process, which can result in an increase in the shifting times, in faster and increased wear of the friction surface and of the total synchroniser ring as such, and thus in shorter repair and service intervals, quite apart from the fact that the shifting and driving comfort of a motor vehicle is considerably restricted by the poor guidance of the synchroniser ring in the hollow space of the synchroniser ring hub and the uncontrolled movements resulting therefrom. These effects become all the more significant, the more power or torque has to be shifted by a corresponding transmission.

SUMMARY OF THE INVENTION

It is therefore the object of the invention to provide an improved synchroniser ring which is guided better in the synchronous ring hub and with which no uncontrolled relative movements occur in the operating state between the synchroniser ring and the synchroniser ring hub during and/or outside the synchronisation process.

The subject matters of the invention satisfying these objects are characterised by the features of the independent claims 1 and 10.

The dependent claims relate to particularly advantageous embodiments of the invention.

The invention thus relates to a synchroniser ring for a synchronisation device of a shiftable change speed gear transmission including a conical ring member having an inner friction surface and an outer installation surface which each bound the ring member in a radial peripheral direction and extend conically around an axial synchroniser ring axis of the synchroniser ring at a predeterminable friction angle. The ring member is bounded in the axial direction at a largest conical diameter by a gear surface with gear extending substantially perpendicular to the synchroniser ring axis and is bounded at a smallest conical diameter by a hub surface. To fix the synchroniser ring in a cylindrical hollow space of a synchroniser ring hub, a security against rotation is provided which is integrally connected to the ring member and extends from the gear surface of the ring body in the direction of the hub surface. In accordance with the invention, a guide member is provided for the guidance of the installation surface at an inner surface of the cylindrical hollow space at the ring member in a predeterminable region between the gear surface and the hub surface.

It is essential for the invention that a guide member is provided for the support or centering and guidance of the installation surface at an inner surface of the cylindrical hollow space of the synchroniser ring hub at the ring member in a predeterminable region between the gear surface and the hub surface, said guide member preferably being provided in the form of a plurality of indentations which are distributed over the installation surface in the peripheral direction.

Since securities against rotation are also provided, preferably in the form of security lugs, in addition to the guide members, a synchroniser ring in accordance with the invention is simultaneously exceptionally secured by the securities against rotation against a rotation with respect to the synchroniser ring hub and is simultaneously reliably guided and centered, in particular with respect to the radial direction in the cylindrical hollow space in the synchroniser ring hub.

This means that a synchroniser ring in accordance with the invention no longer tends to uncontrolled movements, like the conical synchroniser rings known from the prior art, e.g. to small radial excursions or tilt movements which can e.g. be expressed in unpleasant vibrations, due to its conical outer shape which cooperates with a cylindrical inner contact surface in the cylindrical hollow space of the synchroniser ring hub. The reliability and precision of the synchronisation process is thereby considerably positively influenced by use of a synchroniser ring in accordance with the invention, which can contribute to a reduction in the shifting times, which reduces the wear at the friction surface and of the whole synchroniser ring as such and which thus contributes to longer repair and service intervals, quite apart from the fact that the shifting and driving comfort of a motor vehicle is considerably increased by the exceptional guidance of the synchroniser ring in accordance with the invention in the hollow space of the synchroniser ring hub. These positive effects become all the more effective, the more power or torque has to be shifted by a corresponding transmission.

In a specific embodiment, the gear surface is interrupted by a cut-out, in particular by one or two, or three, or more than three cut-outs, and/or the security against rotation is connected to the ring member in the cut-out.

Preferably, but not necessarily, just as many securities against rotation are provided as cut-outs in the gear surface. In an embodiment particularly important for practice, precisely three securities against rotation are provided which guarantee a maximum of security against rotation with a minimal construction effort.

The security against rotation can in particular be configured as a security lug which extends on the side of the ring member remote from the synchroniser ring axis substantially directed in the same way toward the installation surface.

In a very specific embodiment, the security lug can be a security lug having a pocket-like cut-out, whereby an improved anchorage of the synchroniser ring in the synchroniser ring hub can be achieved in the individual case.

The number of guide members which can be provided at a synchroniser ring in accordance with the invention preferably lies between two and nine guide members, specifically three guide members, with particularly preferably six guide members being provided, and/or in each case two guide members being arranged at substantially the same interval in the peripheral direction and/or in each case two guide members being arranged between two securities against rotation, whereby a very high degree of radial guidance can be ensured with a minimal construction effort.

In an embodiment particularly important for practice, the guide member is made in the form of an indentation of the ring member at the installation surface, said indentation extending radially away outwardly from the synchroniser ring axis.

Preferably, a wear reducing and/or a friction optimised friction means, in particular a friction coating, specifically a molybdenum coating and/or a friction layer, in particular a carbon friction layer and/or another friction means is provided on or at the friction surface.

In construction terms, the synchroniser ring is a shaped sheet metal part manufactured from a deep-drawable metal sheet and/or is made from a steel, preferably from C55, C80 or C80M steel, in particular from C35 or C45 steel.

In other embodiments, there is provided a synchronizer ring made of deep-drawable sheet metal, comprising a ring-shaped sheet metal body having a conical section arranged between a wall and a hub surface. The conical section has a conical inner friction surface and a conical outer installation surface. One or more radially outwardly projecting indentations are integrally formed with the ring-shaped sheet metal body and functioning as one or more guide elements. The wall is located at a largest conical diameter side of the ring-shaped sheet metal body and extends substantially perpendicular to a ring body axis. Gear teeth are arranged on a radially outer end of the wall. The one or more guide elements are arranged between the conical section and the hub surface. The one or more guide elements are configured to provide centering guidance relative to a hollow cylindrical surface of a synchronizer ring hub, whereby the ring-shaped sheet metal body is centered with respect to the synchronizer ring hub when a hub surface end of the ring-shaped sheet metal body is slid into the synchronizer ring hub. One or more anti-rotation members project or extend from the largest conical diameter side of the ring-shaped sheet metal body toward a direction of the hub surface. The one or more anti-rotation members are adapted to extend into a respective opening arranged in the synchronizer ring hub.

The ring-shaped sheet metal body may be a one-piece member. The one or more guide elements may comprise plural equally spaced integrally formed guide elements. The one or more anti-rotation members may comprise plural equally spaced and/or integrally formed anti-rotation members. The synchronizer ring may be arranged on a synchronising device of a shiftable change speed gear transmission. The wall may comprise one or more cut-outs or sections that lack gear teeth. One of the one or more anti-rotation members may be arranged in one of the one or more cut-outs or sections that lack gear teeth.

Each of the anti-rotation members may be a lug that one of extends into a slot-shaped opening arranged in the synchronizer ring hub and is oriented substantially parallel to the ring member axis. Each of the anti-rotation members is arranged in one of a cut-out or a section of the wall that lack gear teeth. The one or more anti-rotation members may comprise three anti-rotation members and each is arranged in one of three cut-outs or sections of the wall that lack gear teeth. At least one of the anti-rotation members may be a lug having a recess. The one or more guide elements may comprise between two and nine guide elements. The one or more guide elements may comprise between two and nine integrally formed and equally spaced guide elements.

The conical inner friction surface may comprise one of a wear-reducing coating, a friction coating or layer, a molybdenum coating and/or a carbon friction layer.

The deep-drawable sheet metal is at least one of steel, C55, C80 or C80M steel and C35 or C45 steel.

The invention also provides for a manual transmission for a vehicle comprising the synchronizer ring described above.

The invention also provides for a synchronizer ring made of deep-drawable sheet metal, comprising a sheet metal ring body having a conical section arranged between a wall and a hub end. The conical section has a conical inner friction surface and a conical outer installation surface. Plural radially outwardly projecting indentations are integrally formed with the conical section and functioning as centering guide elements. The wall is located at a largest conical diameter side of the ring body and extending substantially perpendicular to a ring axis. Gear teeth are arranged on a radially outer end of the wall. Plural centering guide elements extend to the hub end. Each centering guide element comprises at least one of converging outer edges which converge toward one another as the approach a radially outer edge and a rounded radially outer edge. The centering guide elements are configured to provide centering guidance relative to a hollow cylindrical surface of a synchronizer ring hub, whereby the ring body is centered with respect to the synchronizer ring hub when the hub end of the ring body is slid into the synchronizer ring hub. Plural integrally formed anti-rotation members project or extend toward a direction of the hub. The plural anti-rotation members are configured to extend into openings arranged in the synchronizer ring hub when the hub end of the ring body is slid into the synchronizer ring hub.

The invention also provides for a synchronizer device comprising a sheet metal ring member having an integrally formed conical section arranged between an integrally formed wall with a gear and a hub end. The conical section has a conical inner surface and a conical outer surface that is substantially parallel to the conical inner surface. Plural radially outwardly projecting are integrally formed indentations functioning as centering guide elements. The wall with the gear is located at a largest conical diameter side of the ring member and extending substantially perpendicular to a ring member axis. Plural integrally formed guide elements extend to the hub end and having radially outer rounded edges. A synchronizer ring hub comprises an inner cylindrical surface and anti-rotation openings. The guide elements are configured to provide centering guidance relative to the cylindrical surface of the synchronizer ring hub, wherein the ring member is centered with respect to the synchronizer ring hub when the hub end of the ring member is slid into the synchronizer ring hub. Plural integrally formed anti-rotation members project or extend toward a direction of the hub. Each anti-rotation member extends into a respective anti-rotation opening arranged in the synchronizer ring hub when the hub end of the ring member is slid into the synchronizer ring hub.

The one or more guide elements may comprise a rounded or outwardly curved radially outer edge. The one or more anti-rotation members may have ends that face in a direction parallel to the ring body axis and are integrally formed. The one or more guide elements may comprise at least one of converging outer edges which converge toward one another as the approach a radially outer edge and a rounded radially outer edge. The one or more guide elements may comprise a radially outermost edge and a radially innermost edge axially spaced from the wall by a lesser amount that the radially outermost edge. The one or more guide elements may comprise a radially outermost edge and a radially outer edge located where the one or more guide elements meets the conical outer installation surface, wherein the radially outer edge is axially spaced from the wall by a lesser amount that the radially outermost edge.

The invention further relates to a manual transmission for a vehicle, in particular for a passenger car, a transporter or a truck, including a synchroniser ring in accordance with one of the preceding claims.

BRIEF DESCRIPTION OF THE DRAWINGS

The invention will be explained in more detail in the following with reference to the schematic drawing. There are shown:

FIG. 4 is a security lug having a pocket-like cut-out.

DESCRIPTION OF THE PREFERRED EMBODIMENTS

Figure 1:
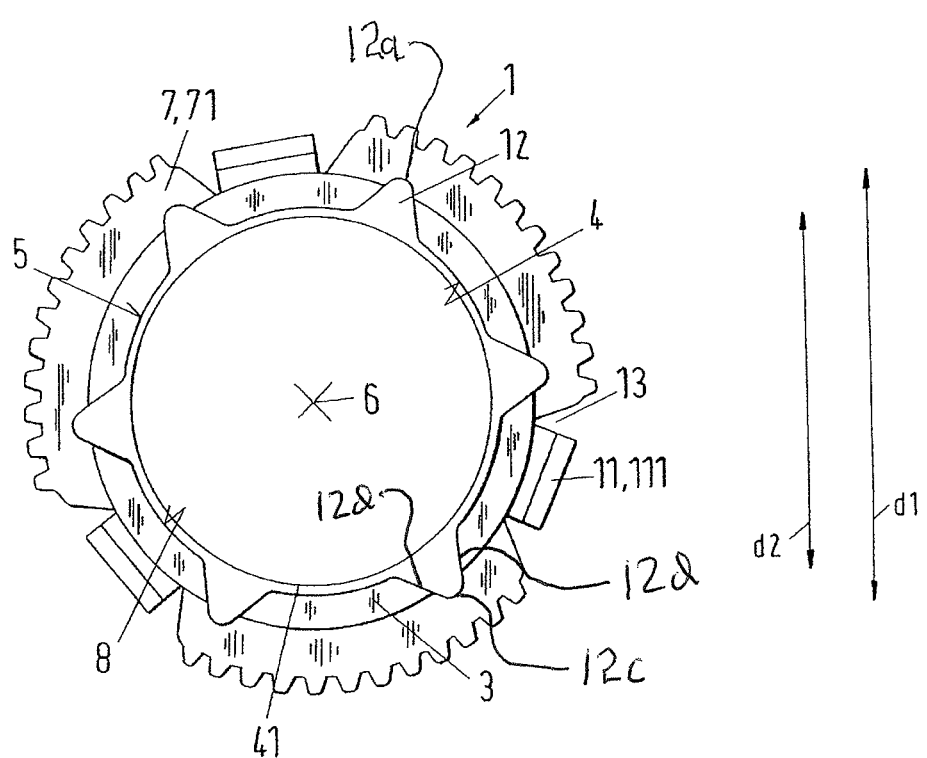
FIG. 1 is an embodiment of a synchroniser ring in accordance with the invention in section.

FIG. 1 shows, in a schematic representation in section, an embodiment of a synchroniser ring in accordance with the invention which is designated as a whole in the following by the reference numeral 1. The same reference numerals in the different Figures designate technically equivalent features or relate to features with a technically equivalent function.

The synchroniser ring 1 of FIG. 1 includes a conical ring member 3 having an inner friction surface 4 with a carbon friction layer 41 and an outer installation surface 5 which respectively bound the ring member 3 in a radial peripheral direction in a manner known per se. The outer installation surface 5 and the inner friction surface 4 extend substantially parallel to one another at a predeterminable friction angle α, which cannot be seen in FIG. 1, conically around an axial synchroniser ring axis 6 of the synchroniser ring 1.

The ring member 3 is bounded in the axial direction at a largest conical diameter d 1 by a gear surface 7 with gear 71 extending substantially perpendicular to the synchroniser ring axis 6 and is bounded at a smallest conical diameter d2 by a hub surface 8. To fix the synchroniser ring 1 in a cylindrical hollow space 9 of a synchroniser ring hub 10, which is not shown in FIG. 1, a security against rotation 11 is provided which is integrally connected to the ring member 3 and extends from the gear surface 7 of the ring member 3 in the direction towards the hub surface 8, a construction such as is in principle already known from the prior art. The security against rotation 11 in accordance with FIG. 1 is a security lug 111 which can be formed, for example, on the manufacture of the synchroniser ring 1 by bending over a portion initially projecting radially outwardly from the ring member 3 in the direction towards the installation surface 5.

This means the security against rotation 11, which is made as a security lug 111, extends on the side of the ring member 3 remote from the synchroniser ring axis 6 substantially directed in the same way to the installation surface 5.

As will be explained even more precisely later with reference to the following Figures, the security lug 111 is configured and is arranged with respect to the installation surface such that the security lug 111 can be anchored in a corresponding cut-out 101 of the synchroniser ring hub 10 in the installed state.

Figure 2:
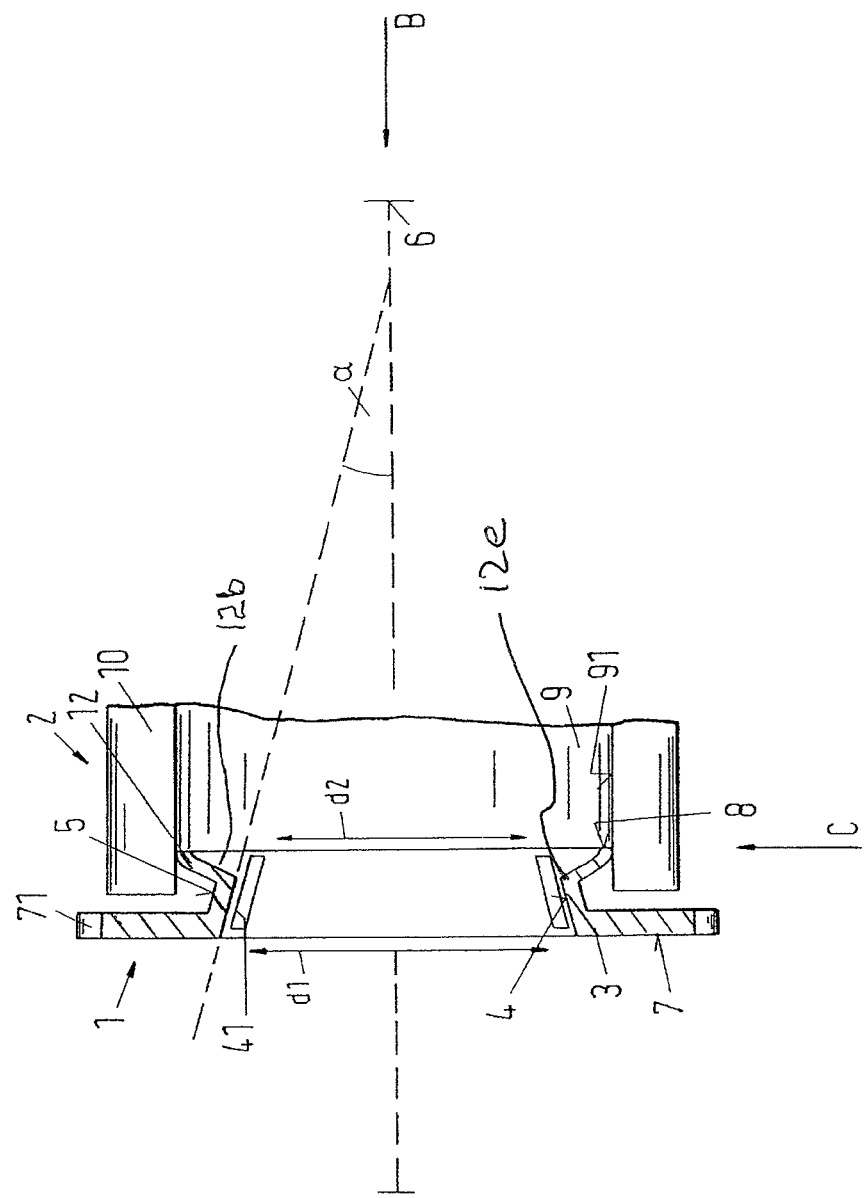
FIG. 2 is a side view of a synchroniser ring in accordance with FIG. 1 in the installed state.

In accordance with the invention, a guide member 12 is provided for the guidance of the installation surface 5 at an inner surface 91 of the cylindrical hollow space 9 of the synchroniser ring hub 10, which is, as stated, not shown in FIG. 1 because FIG. 1 does not show the synchroniser ring 1 in the installed state, in a predeterminable region between the gear surface 7 and the hub surface 8, said guide member being configured in the embodiment of FIG. 1 and FIG. 2 of enormous importance for practice in the form of an indentation 12*b* defining the guide member 12 of the ring member 3 at the installation surface 5, with the indentation 12*b* extending radially away outwardly from the synchroniser ring axis 6. In addition to the indentation 12*b* defining the guide member 12, the guide member 12 also includes a rounded edge 12*a* that is formed by converging outer edges 12*d* extending to a radially outermost edge 12*c*. As can be seen in FIG. 2, an radially innermost edge 12*e* is axially spaced from the wall 7 by a lesser amount than the radially outermost edge 12*c*.

In the installed state of the synchroniser ring 1, the indentations 12*b* in accordance with the invention then center and guide the synchroniser ring 1 securely and reliably in the cylindrical hollow space 9 provided in the synchroniser ring hub 10 for the reception of the installation surface 5.

In FIG. 2, a side cross-section view of a synchroniser ring 1 in accordance with FIG. 1 is shown schematically in the installed state. As should be apparent from FIG. 2, the indentations 12b are tapered in the radially inward direction. The section has been selected along the arrow A in accordance with FIG. 3 just such that the security lug 111 cannot be seen.

The conical ring member 3 with its inner friction surface 4, which has a carbon friction layer 41 in the present example as shown in FIGS. 1 and 2, , and the outer installation surface 5 extend conically and substantially parallel to one another at the friction angle α around the axial synchroniser ring axis 6 of the synchroniser ring 1.

The synchroniser ring 1 is supported in a centered fashion with the installation surface 5 in the hollow space 9 of the synchroniser ring hub 10 by the guide elements 12 in accordance with the invention, which are defined by indentations 12b.

The gear surface 7 with gear 71 is located in a manner known per se outside the synchroniser ring hub 10 such that the gear 71 can enter into rotationally fixed engagement with a further gear not shown in FIG. 2 of a shiftable change speed gear transmission likewise not shown.

Figure 3:
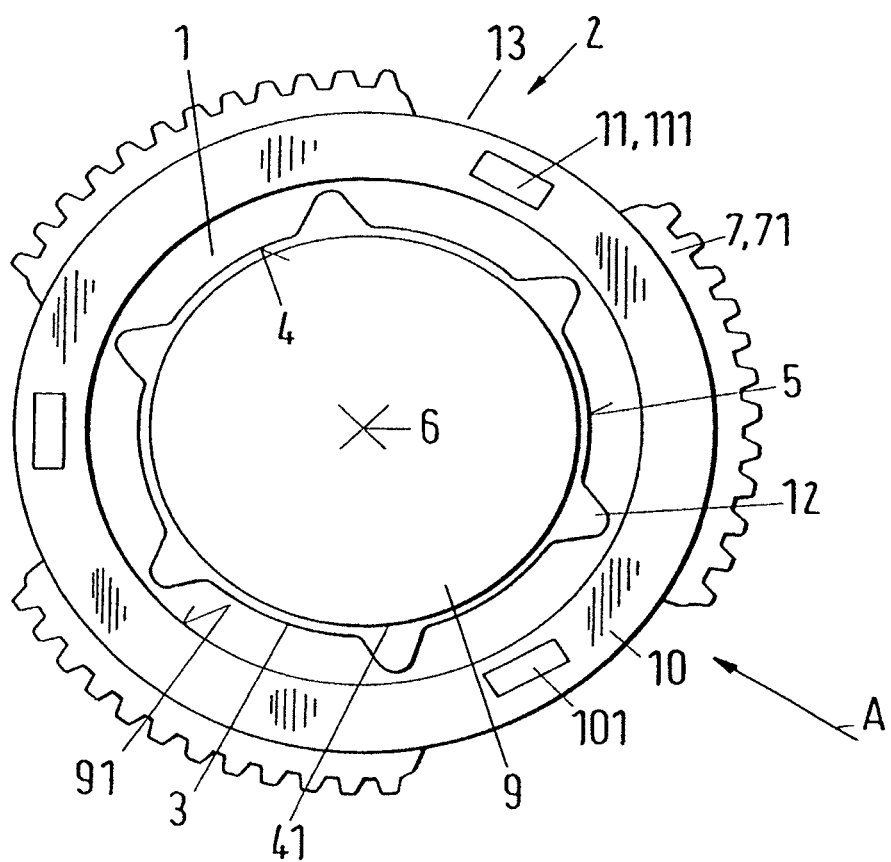
FIG. 3 is another view in accordance with FIG. 2.

In FIG. 3, finally, the synchroniser ring of FIG. 1 can again be seen from a direction B in accordance with FIG. 2 in a section along and at the point C, such as is designated more closely by the arrow C in FIG. 2.

It can be seen particularly easily in FIG. 3 how the security against rotation 11, which is integrally connected to the ring member 3 and extends from the gear surface 7 of the ring member 3 in the direction towards the hub surface 8 is anchored in the cut-out 101 of the synchroniser ring hub 10 for the fixing of the synchroniser ring 1 in the cylindrical hollow space 9 of the synchroniser ring hub 10 and, as already mentioned, is a security lug 111. The synchroniser ring 1 is reliably secured against rotation around the synchroniser ring axis 6, with the exception of small angles, by the anchorage of the security lug 111 in the cut-out 101 of the synchroniser ring hub 10. For technical reasons, however, which are sufficiently known to the person skilled in the art, small rotational movements of the synchroniser ring 1 are preferably to be allowed around the synchroniser ring axis 6. This is achieved in that the cut-outs 101 are somewhat wider in the peripheral direction than the security lugs 111.

In FIG. 4, finally, another specific embodiment of the present invention is shown in a schematic manner, with the security against rotation 11 being a security lug 111 which is configured as a security lug 1110 having pocket-like cut-outs such that they can be anchored in a corresponding cut-out of another synchroniser ring hub 10, with the cut-outs for the anchorage of the security lugs 1110 of the other synchroniser ring hub 10 then being formed correspondingly, e.g. in two parts with a center web, whereby a better fixing of the synchroniser ring 1 to the synchroniser ring hub 10 is possible in specific cases.

It is understood that all the embodiments explicitly discussed in this application are only to be understood as exemplary for the invention and in particular all suitable combinations which can advantageously be used for specific applications or all further developments obvious to the skilled person are also covered by the invention.

What is claimed is:

1. A synchronizer ring made of deep-drawable sheet metal, comprising:
    a ring-shaped sheet metal body having a conical section arranged between a wall and a hub surface;
    the conical section having a conical inner friction surface and a conical outer installation surface;
    one or more radially outwardly projecting guide elements defined by radially outwardly projecting tapered indentations integrally formed with the ring-shaped sheet metal body;
    the wall being located at a largest conical diameter side of the ring-shaped sheet metal body and extending substantially perpendicular to a ring body axis;
    gear teeth arranged on a radially outer end of the wall;
    the one or more guide elements arranged between the conical section and the hub surface;
    said one or more guide elements being configured to provide centering guidance relative to a hollow cylindrical surface of a synchronizer ring hub, whereby the ring-shaped sheet metal body is centered with respect to the synchronizer ring hub when a hub surface end of the ring-shaped sheet metal body is slid into the synchronizer ring hub;
    one or more anti-rotation members projecting or extending from the largest conical diameter side of the ring-shaped sheet metal body toward a direction of the hub surface; and
    said one or more anti-rotation members being adapted to extend into a respective opening arranged in the synchronizer ring hub.

2. The ring of claim 1, wherein the ring-shaped sheet metal body is a one-piece member.

3. The ring of claim 1, wherein the one or more guide elements comprise plural equally spaced integrally formed guide elements.

4. The ring of claim 1, wherein the one or more anti-rotation members comprise plural equally spaced and/or integrally formed anti-rotation members.

5. The ring of claim 1, wherein the synchronizer ring is arranged on a synchronising device of a shiftable change speed gear transmission.

6. The ring of claim 1, wherein the wall comprises one or more cut-outs or sections that lack gear teeth.

7. The ring of claim 6, wherein one of the one or more anti-rotation members is arranged in one of the one or more cut-outs or sections that lack gear teeth.

8. The ring of claim 6, wherein each of the anti-rotation members is a lug that one of:
    extends into a slot-shaped opening arranged in the synchronizer ring hub; and
    is oriented substantially parallel to the ring member axis.

9. The ring of claim 1, wherein each of the anti-rotation members is arranged in one of:
    a cut-out; or
    a section of the wall that lack gear teeth.

10. The ring of claim 1, wherein the one or more anti-rotation members comprise three anti-rotation members and each is arranged in one of three:
    cut-outs; or
    sections of the wall that lack gear teeth.

11. The ring of claim 1, wherein at least one of the anti-rotation members is a lug having a recess.

12. The ring of claim 1, wherein the one or more guide elements comprise between two and nine guide elements.

13. The ring of claim 1, wherein the one or more guide elements comprise between two and nine integrally formed and equally spaced guide elements.

14. The ring of claim 1, wherein the conical inner friction surface comprises one of:
a wear reducing coating;
a friction coating or layer;
a molybdenum coating; and/or
a carbon friction layer.

15. The ring of claim 1, wherein the deep-drawable sheet metal is at least one of:
steel;
C55, C80 or C80M steel; and
C35 or C45 steel.

16. A manual transmission for a vehicle comprising the synchronizer ring of claim 1.

17. The ring of claim 1, wherein the one or more guide elements comprise a rounded or outwardly curved radially outer edge.

18. The ring of claim 1, wherein the one or more anti-rotation members have ends that face in a direction parallel to the ring body axis and are integrally formed.

19. The ring of claim 1, wherein the one or more guide elements comprises at least one of:
converging outer edges which converge toward one another as they approach a radially outer edge; and
a rounded radially outer edge.

20. The ring of claim 1, wherein the one or more guide elements comprise:
a radially outermost edge; and
a radially innermost edge axially spaced from the wall by a lesser amount that the radially outermost edge.

21. The ring of claim 1, wherein the one or more guide elements comprise:
a radially outermost edge; and
a radially outer edge located where the one or more guide elements meets the conical outer installation surface,
wherein the radially outer edge is axially spaced from the wall by a lesser amount that the radially outermost edge.

22. A synchronizer ring made of deep-drawable sheet metal, comprising:
a sheet metal ring body having a conical section arranged between a wall and a hub end;
the conical section having a conical inner friction surface and a conical outer installation surface;
plural radially outwardly projecting centering guide elements defined by radially outwardly projecting tapered indentations integrally formed with the conical section;
the wall being located at a largest conical diameter side of the ring body and extending substantially perpendicular to a ring axis;
gear teeth arranged on a radially outer end of the wall;
the plural centering guide elements extending to the hub end;
each centering guide element comprising at least one of:
converging outer edges which converge toward one another as they approach a radially outer edge; and
a rounded radially outer edge;
said centering guide elements being configured to provide centering guidance relative to a hollow cylindrical surface of a synchronizer ring hub, whereby the ring body is centered with respect to the synchronizer ring hub when the hub end of the ring body is slid into the synchronizer ring hub;
plural integrally formed anti-rotation members projecting or extending toward a direction of the hub; and
said plural anti-rotation members being configured to extend into openings arranged in the synchronizer ring hub when the hub end of the ring body is slid into the synchronizer ring hub.

23. A synchronizer device comprising:
a sheet metal ring member having an integrally formed conical section arranged between:
an integrally formed wall with a gear; and
a hub end;
the conical section having a conical inner surface and a conical outer surface that is substantially parallel to the conical inner surface;
plural radially outwardly projecting centering guide elements integrally formed with the conical section and being defined by radially outwardly projecting tapered indentations;
the wall with the gear being located at a largest conical diameter side of the ring member and extending substantially perpendicular to a ring member axis;
the plural integrally formed centering guide elements extending to the hub end and having radially outer rounded edges;
a synchronizer ring hub comprising an inner cylindrical surface and anti-rotation openings;
said guide elements being configured to provide centering guidance relative to the cylindrical surface of the synchronizer ring hub, wherein the ring member is centered with respect to the synchronizer ring hub when the hub end of the ring member is slid into the synchronizer ring hub;
plural integrally formed anti-rotation members projecting or extending toward a direction of the hub; and
each anti-rotation member extending into a respective anti-rotation opening arranged in the synchronizer ring hub when the hub end of the ring member is slid into the synchronizer ring hub.

* * * * *